(No Model.)
N. S. KEITH.
ART OF OBTAINING GOLD AND SILVER FROM AURIFEROUS AND ARGENTIFEROUS MATERIALS.
No. 597,820. Patented Jan. 25, 1898.
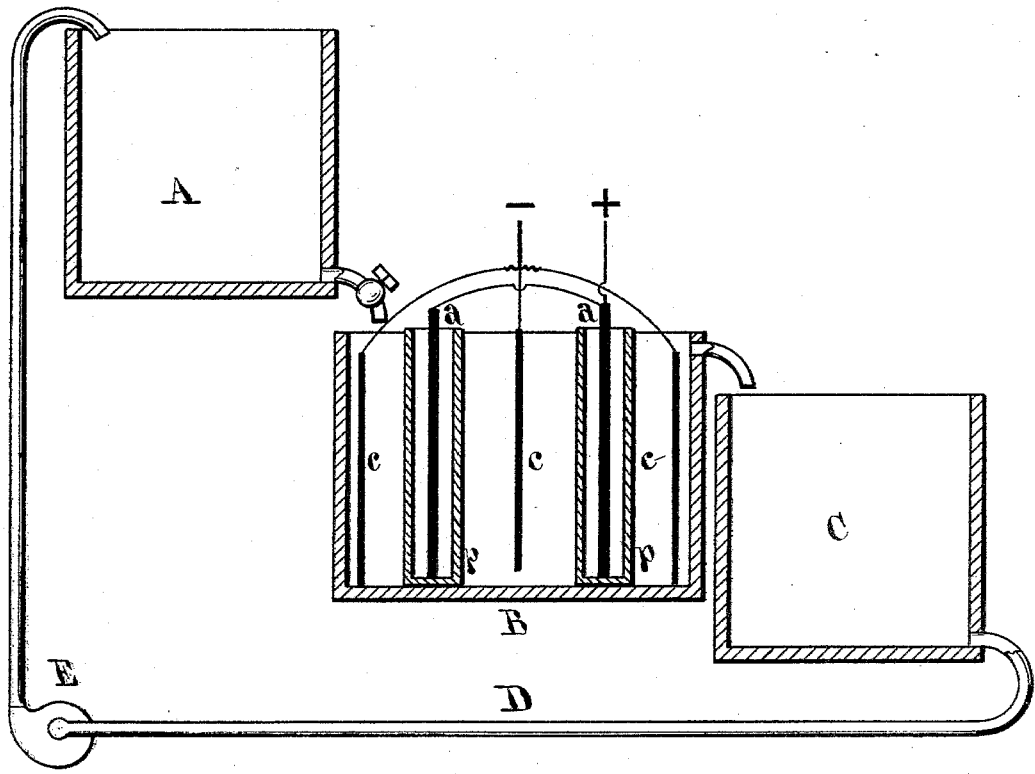
Witnesses:
H. T. Hincks
J. M. Hincks
Inventor:
N. S. Keith.

UNITED STATES PATENT OFFICE.

NATHANIEL S. KEITH, OF CHESTER, ENGLAND.

ART OF OBTAINING GOLD AND SILVER FROM AURIFEROUS AND ARGENTIFEROUS MATERIALS.

SPECIFICATION forming part of Letters Patent No. 597,820, dated January 25, 1898.

Application filed February 21, 1895. Serial No. 539,275. (No specimens.)

*To all whom it may concern:*

Be it known that I, NATHANIEL SHEPARD KEITH, a citizen of the United States of America, residing in the city of Chester, England, have made new and useful Improvements in the Art of Obtaining Gold and Silver from Auriferous and Argentiferous Materials; and I declare that the following is a full and exact description thereof, sufficient to enable those skilled in the art to which it pertains to make and use the same.

The accompanying drawing shows a vertical section of an apparatus in which my invention may be carried out.

A is a vessel in which the auriferous or argentiferous material is submitted to the action of my solvent.

B is a vessel in which the gold and silver dissolved from the material in A is electrolytically deposited. In B, $a\,a$ are anodes in porous cells $p\,p$, and $c\,c\,c$ are cathodes.

C is a vessel into which the solution drawn from A flows after passing through B.

D is a pipe, and E is a centrifugal or other pump, through which the solution is drawn and elevated into the vessel A or other receptacle to be again used.

The signs $+$ and $-$ refer to the wires proceeding from a suitable source of electricity.

While part of my process is applicable to the recovery of the metal from many solutions of gold and silver, it is specially designed to the obtaining of those metals from rocks and ores.

Heretofore the most practiced plan has been to submit the ground or pulverized ore containing gold and silver to the action in percolators of dilute solutions of cyanid of potassium, which dissolved much of the gold contained in the rocks or ores, from which solutions the gold was obtained by precipitation by means of zinc in the well-known way. The gold has also been obtained from the above cyanid solution by means of electrodeposition. In this case sheets of iron were generally used as anodes, and for cathodes sheets of lead. Many other methods involving electrolytic action, actual or alleged, have been suggested, but none of them have been, in my belief, put to practical use. The main objections to the zinc deposition are the great wastes of zinc and cyanid of potassium due to the impossibility of effecting the deposition in chemically-equivalent quantities. The same objections prevail with the before-mentioned electrical depositions. Iron and other metals many times in excess were used, and consequently more cyanid than the chemical equivalents of the materials involved in the actions and reactions necessary to deposit gold electrically from suitably-organized electrolytic baths. Again, when insoluble anodes were used oxygen in its nascent condition was set free in the solution and oxidized the cyanid to cyanate, which is useless for dissolving gold. It is more economical to use the solution of cyanid over and over again, if possible.

By this my process I provide materials to be associated with the cyanid of potassium from the beginning throughout, so that the actions and reactions may be according to the laws of chemical equivalents of the essential materials involved. For example, the gold dissolved shall replace in the solution some equivalent quantity of some substance which shall again go into solution to again act instead of escaping as gas or forming part of compounds which are inert for the purpose. Then the gold and this substance shall be by electrical action recovered from the solution, wasting only an equivalent quantity of a cheap material. In this way the minimum quantity of material is used and the minimum amount of electricity is required, so that the cost of the process is at the minimum.

I will now describe my process. After preparing the usual solution of cyanid of potassium, which is variously made of different strengths, varying from, say, 0.01 per centum to 5.0 per centum, I add a solution of mercury in a solution of cyanid of potassium—for instance, that made by dissolving oxid of mercury in a solution of cyanid of potassium or that made by electrolytic solution of mercury in the same solution. This latter is made by making mercury the anode in an electrolytic bath and is well known as "the battery process" with other metals. I prefer, however, to form my solution of mercury by using for the electrolyte a solution in water of equal parts of cyanid of potassium with bromid of potassium, in which mercury is more easily soluble. I may also use solutions of other salts of mercury, such as the chlorids or iodids. I add the solution of mercury, preferably, at least in quantity sufficient to supply an ounce of mercury to each ounce of gold to be dissolved by the solution; but the amount may be varied without departing from my invention. Sometimes it may be preferable to add more mercury in this way, so that more may be associated with the gold at the subsequent stage, where the gold and mercury are recovered on the cathode of an electrolytic bath, as is hereinafter set forth. In this solution gold replaces the mercury to become cyanid, bromid, iodid, or chlorid of gold, and the mercury is again dissolved by the cyanid of potassium to be again replaced by more gold or deposited on the cathode of the subsequent electrolytic bath. Having prepared my solution, I submit the auriferous or argentiferous materials to its action in the same manner as heretofore practiced in vats, tanks, or the like. In a solution of cyanid of potassium gold is electropositive to mercury, and by reason of that quality is capable of combination and does combine with the cyanogen or the bromid or the other equivalent acid constituent of the solution of mercury associated with the solution of cyanid of potassium, setting the mercury free to be redissolved. By this action the gold becomes much more freely soluble in the cyanid-of-potassium solution. The first action is probably the reduction of mercury on the surface of the gold, where by reason of the combination of the electropositive gold and the electronegative mercury the solving action goes on more rapidly than is the case where a simple solution of cyanid of potassium alone is used.

It is necessary in order to insure speedy dissolving of gold by a solution of cyanid of potassium to have the particles of gold in actual contact with some material which is electronegative to it in that solution. For instance, besides mercury, iron and carbon both possess this quality. In the case of iron I use it in solution, as just described, when mercury is used, the action being the same; but I prefer mercury, because recoverable in the subsequent stages of the process. If carbon be used, I mix it in a pulverized or other finely-divided state with the auriferous or argentiferous materials, rocks, or ores, likewise finely divided or pulverized, so that the particles of carbon may be more readily brought into actual contact with the particles of gold and silver. Oxygen and other gases, such as bromin and chlorin, are electronegative to gold and hasten its dissolving in various menstrua, but they either primarily or secondarily cause the oxidation of the menstrua with corresponding decrease in solvent power. I may use these last-named materials in the obtaining of the solutions of gold or silver, but do not prefer them for obvious reasons after this description.

When the solution is drawn from the vats, I pass it either continuously through or treat it in divided quantities successively in an electrolytic bath constituted as follows: I prefer to treat the solution continuously by having the anode and cathode surfaces large enough, so that the solution entering continuously at one part of the depositing vat or tank or box runs out at another part, exhausted of its gold and silver constituents, into another vat containing auriferous or argentiferous materials. I use for the anode any metal or material which is a conductor of electricity and also practically insoluble or unalterable in the electrolyte in which it is immersed while in an inactive state—that is, when no electric current is acting on it—but while it is an anode for a current of electricity will be freely dissolved by the electrolyte or form compounds with the component parts, or some of them, of the electrolyte that do not practically impede the current of electricity, or, in other words, offer too great resistance for the practical working of the process. Zinc is the best metal I have used, though iron may be used in the absence of zinc. I use zinc or iron in the form of plates, rods, prisms, or other forms. I preferably amalgamate the surfaces of zinc with mercury. I also may, when I desire to replenish the mercury in the solution used as the cathode-electrolyte of the bath, use mercury as an anode in a manner hereinafter described. I place my anodes in separate electrolytes, distinct from the electrolyte in which I place my cathode, as is hereinafter more fully set forth. I denominate the two electrolytes, respectively, the "anode-electrolyte" and the "cathode-electrolyte." I sometimes place the mercury anode in the electrolyte for the cathode. I may use two or three of these aforementioned anodes at the same time, but each in its appropriate electrolyte, as hereinafter set forth. I may use a carbon anode in one case as a support for the mercury, which is the true anode part of the combination. If I use a carbon anode exclusively, oxygen may be set free at it, which action requires more electrical energy to be expended and the electrolyte is decomposed. For the cathode I may use any conducting material or metal—such as carbon, copper, lead, or mercury—but I prefer to use a metal which will retain an adherent coating of mercury without materially losing its cohesive strength. Copper I have found best adapted for this purpose. Preferably I use it in sheet form because of the extended surface.

I use two kinds of electrolytes—one for the anode and the other for the cathode. The one for the anode is such as will dissolve the anode only under the influence of the electric current or form with it compounds which do not practically impede the passage of the electric current. With a carbon anode oxygen might be set free to escape as gas. The anode-electrolyte must not communicate deleterious materials or qualities to the other electrolyte. When zinc is the anode, I prefer a half-saturated solution of chlorid of ammonium in water for its electrolyte, or I may use a like solution of sulfate of ammonium for the electrolyte for either zinc, iron, or carbon anode. When I use mercury as an anode, for its electrolyte I prefer a strong solution of cyanid of potassium—say one ounce to a pound of water—but other strengths may be used. To this electrolyte I frequently add a small quantity of chlorid of ammonium or of either bromid of ammonium or potassium to facilitate the solution of mercury in its electrolyte. I separate the two kinds of electrolytes by means of a porous partition, wall, diaphragm, or pot of unglazed earthenware or like material, or asbestos, or skin, or parchment, or any material through which the two electrolytes cannot mix and which permits the passage of electric current. For the other electrolyte I use the solution containing the gold or silver, or both, prepared as I have herein set forth, or otherwise, whether containing mercury or not. If there be no mercury in the solution or electrolyte or only a small quantity, the gold will be deposited on the cathode, be it either lead or copper, in a reguline coherent form and may be recovered from the cathode by well-known means; but I prefer to deposit the gold upon a copperplate cathode which has its surface amalgamated with mercury, which last forms an amalgam with the gold and silver deposited thereon.

I may amalgamate the surface of the copper cathode before beginning the deposition of the gold and deposit the gold and mercury directly thereon in the bath; but as the copper cathode will not hold mercury enough at the beginning to amalgamate all of the metals or gold which should be deposited on it before removal I prefer to supply enough mercury to the solution used for the extraction of the gold or silver from the rocks or ores, as before specified, and afterward used as the cathode-electrolyte to have the joint deposit of gold or silver and mercury made by the electric current a coherent and adherent coating on the cathode. Therefore it is necessary in carrying out this program to add from time to time to the electrolyte some of the aforesaid solution of mercury. This may be done at any stage of the process, but preferably while the solution is the cathode-electrolyte in the electrolytic depositing bath or vat. If the joint deposit of metal and mercury on the cathode be hard, brittle, and disposed to cleave off, more mercury solution should be added. If it be soft and inclined to run off the cathode, less mercury solution should be added. In this way the amalgam on the cathode may be kept in a sufficiently plastic state to be readily removed when desired.

When I use mercury as an anode, as before mentioned, from time to time during the operation of depositing I remove the strong solution used as that anode-electrolyte and put it into the cathode-electrolyte, from whence the mercury dissolved by it in its first position is deposited on the cathode in its second position. I immediately supply its place with fresh strong solution, so that the process may go on as before. When I use zinc or other soluble material for an anode from time to time, as often as the electrolyte has ceased to dissolve the anode or form compounds therewith, as hereinbefore set forth, I remove that electrolyte altogether and replace it with fresh electrolyte.

When the cathode-electrolyte has become sufficiently exhausted of its auriferous or argentiferous contents, either wholly or in greater part, I use it again for dissolving more gold or silver from auriferous or argentiferous materials, rocks, or ores, as before described.

I have found that the process of dissolving gold and silver from auriferous and argentiferous materials, rock, and ores and the recovery of the gold and silver from solutions so made can be much hastened by keeping the solvent in motion through the various parts of the apparatus, so that the sizes of apparatus may be less and the expense of treatment be less than is the case when the materials are treated in stated quantities or batches successively. Therefore in carrying out my process I prefer to pass the solvent continuously through the finely-divided materials, rocks, or ores in the usual percolating-vats, but as fast or slowly as may be found expedient under experience with the various classes and kinds of materials, and then through the depositing-vat, having sufficient strength of electric current and sufficiently-extended anode and cathode surfaces to deposit and receive a greater part or all of its gold and silver. From this the solvent is passed continuously again through the finely-divided materials if not previously exhausted of their gold and silver, and so on in complete cycle until the gold and silver has been dissolved out, when the solvent is turned into a vat of fresh materials and the cycle of action continued as before. Centrifugal or other pumps may be used to move the solvent from the lowest to the highest point in this system of circulation. Under this system of circulation much weaker solvent menstrua may be used, so that that part unavoidably left with the materials may be wasted at a minimum of expense more cheaply than the heretofore-practiced successive percolations and washings with decreasing strengths of solvents can be done. From time to time, whenever necessary or desirable, the cathode is taken from the bath and the amalgam thereon removed by scraping or otherwise, the cathode returned to its place, and the metals of the amalgam separated by distillation as usually practiced in the metallurgy of gold and silver.

Having now particularly described and ascertained the nature of my said invention and in what manner the same is to be performed, I declare that what I claim is—

1. The described process of obtaining a precious metal, such as gold or silver from a cyanid solution containing cyanid of mercury which consists in passing a current of electricity through such solution to a metallic cathode, whereby an easily-removable layer of the precious metal and mercury is simultaneously deposited on said cathode.

2. The described process of obtaining a precious metal, such as gold or silver from a cyanid solution containing cyanid of mercury which consists in passing a current of electricity through such solution to a metallic cathode, whereby an easily-removable layer of the precious metal and mercury is simultaneously deposited on said cathode and finally removing this layer at suitable intervals.

3. The described process of obtaining a precious metal such as gold or silver from its ores which consists first in dissolving the gold or silver in a cyanid solution containing cyanid of mercury and free cyanid of an alkaline metal such as cyanid of potassium and then passing a current of electricity through said solution to a metallic cathode whereby an easily-removable layer of the precious metal and mercury is simultaneously deposited upon said cathode.

In witness whereof I have hereunto set my hand this 12th day of February, 1895.

N. S. KEITH.

Witnesses:
GEO. CULLEN PEARSON,
HAROLD T. HINCKS.